United States Patent

Sugawara et al.

[11] Patent Number: 6,140,954
[45] Date of Patent: Oct. 31, 2000

[54] RADAR DEVICE

[75] Inventors: Takashi Sugawara; Akira Iihoshi, both of Wako, Japan

[73] Assignee: Honda Giken Kogyo Kabushiki Kaisha, Tokyo, Japan

[21] Appl. No.: 09/238,662

[22] Filed: Jan. 26, 1999

[30] Foreign Application Priority Data

Jan. 26, 1998 [JP] Japan .................................. 10-012580

[51] Int. Cl.⁷ .................................................. G01S 13/93
[52] U.S. Cl. .................. 342/70; 342/27; 342/89; 342/159; 342/175; 342/192; 342/195; 342/128; 356/27; 367/87; 367/99; 367/101
[58] Field of Search ................................ 342/61, 70–73, 342/89–93, 159–164, 175, 189, 192–197, 27, 28, 118, 128–133; 356/27, 28, 28.5; 367/87, 89–91, 93, 94, 99, 101, 102

[56] References Cited

U.S. PATENT DOCUMENTS 4,431,993  2/1984  Van Der Mark ........................... 342/91
5,210,772  5/1993  Nakagawa ............................ 342/189 X

FOREIGN PATENT DOCUMENTS 07098375A  4/1995  Japan .
07234277A  9/1995  Japan .

Primary Examiner—Bernarr E. Gregory
Attorney, Agent, or Firm—Lyon & Lyon LLP

[57] ABSTRACT

A radar device for detecting distances and relative speeds of obstructions such as preceding vehicles has a stationary object identifier for identifying stationary objects such as roadside guard rails and the like and a stationary object eliminator for eliminating data identified as pertaining to such stationary objects. The stationary object identifier detects peak densities in a beat spectrum detected as a difference between transmitted and received frequencies of a radar beam modulated to rise and fall in frequency periodically and identifies peak groups having peak densities above a predetermined value as stationary objects. Therefore, it is possible to detect a stationary roadside object on the basis of peak densities. The stationary object eliminator eliminates data of peak groups identified as stationary objects by the stationary object identifier and thereby removes them as objects of combination processing for pairing rise side beat frequencies with fall side beat frequencies. As a result the amount of processing required for this pairing is reduced and the occurrence of wrong pairings is reduced and it is possible to eliminate the unnecessary calculation of distances and relative speeds of roadside objects.

11 Claims, 9 Drawing Sheets

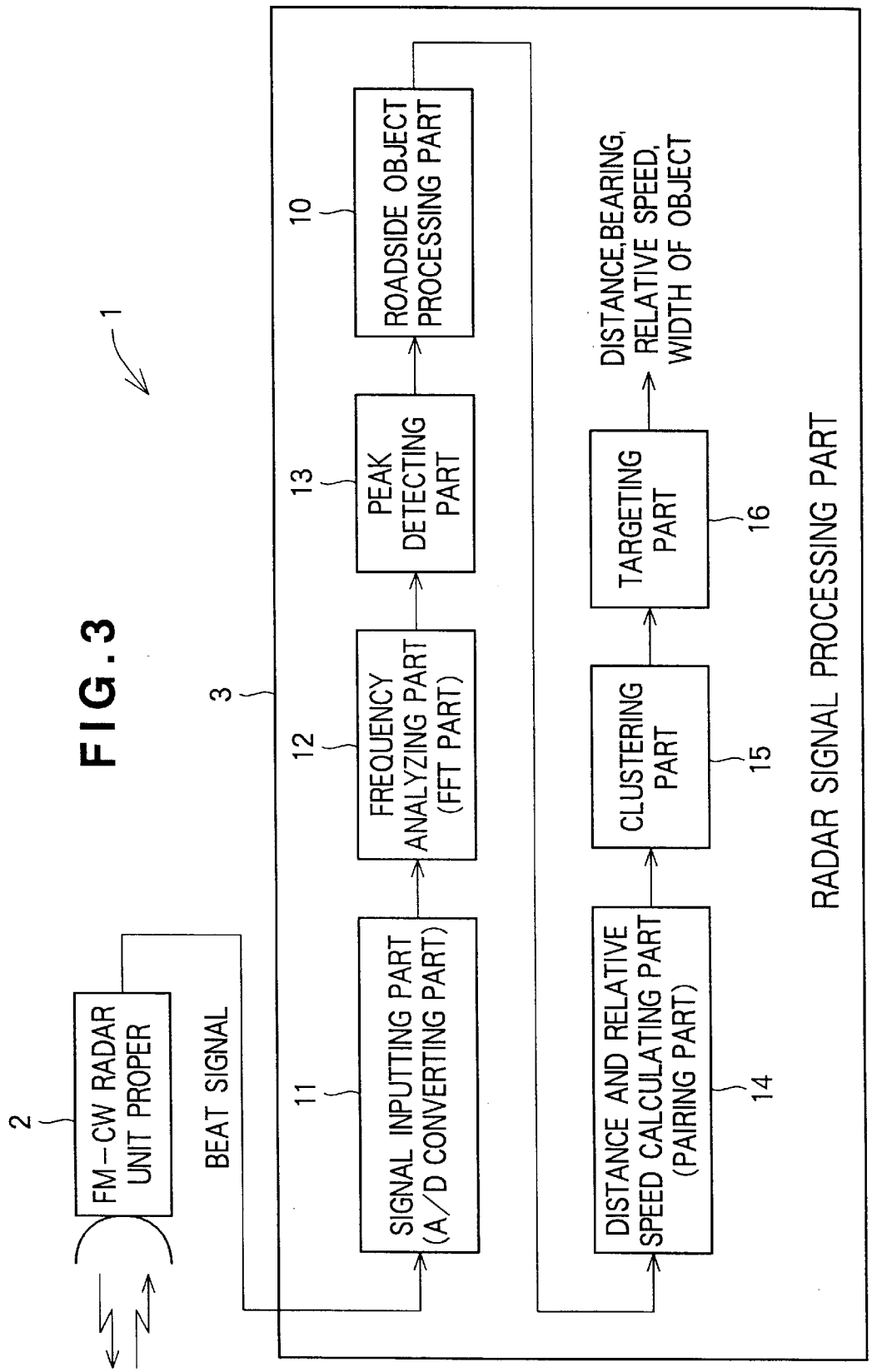

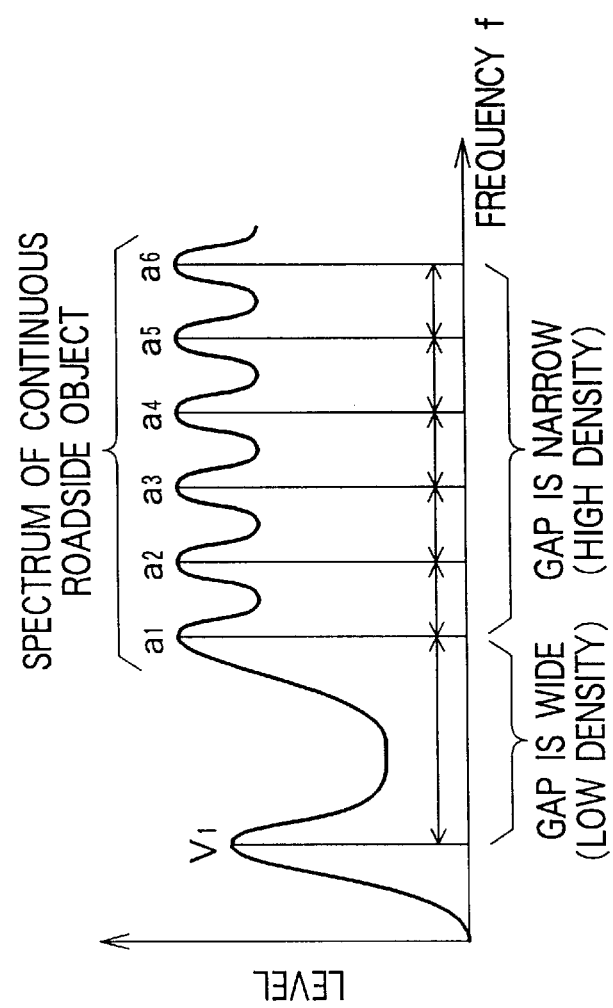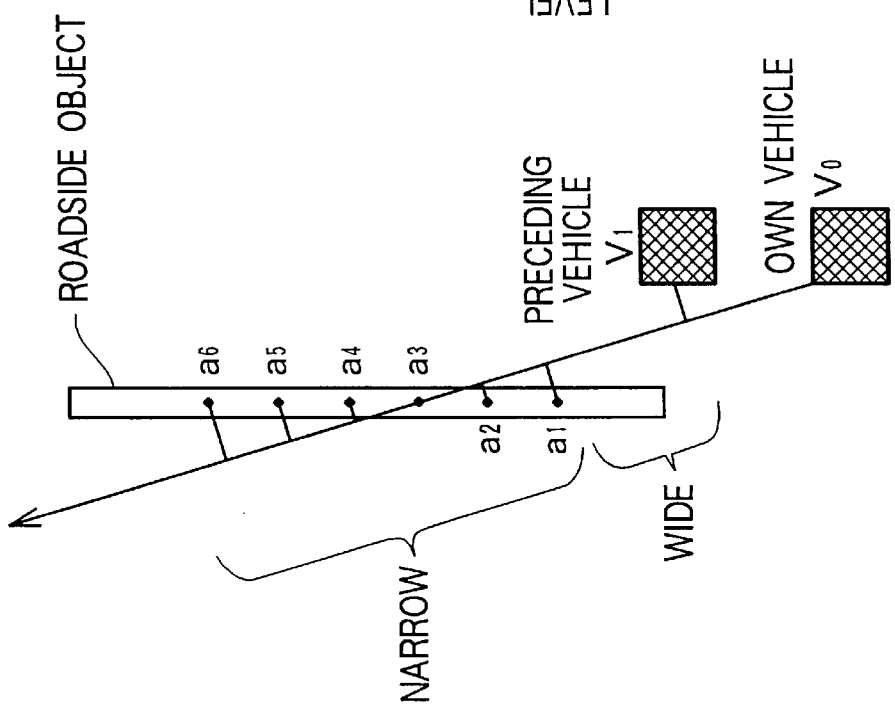

FIG.5A CH1 RISE SIDE fa fb fc fd fe — ROADSIDE OBJECT

PEAK FREQUENCY DIFFERENCE FOR ROADSIDE OBJECT DETERMINATION

FIG.5B CH2 RISE SIDE fg

FIG.5C CH1 FALL SIDE f1 f2 f3 f4 f5 — ROADSIDE OBJECT

FIG.5D CH2 FALL SIDE f6

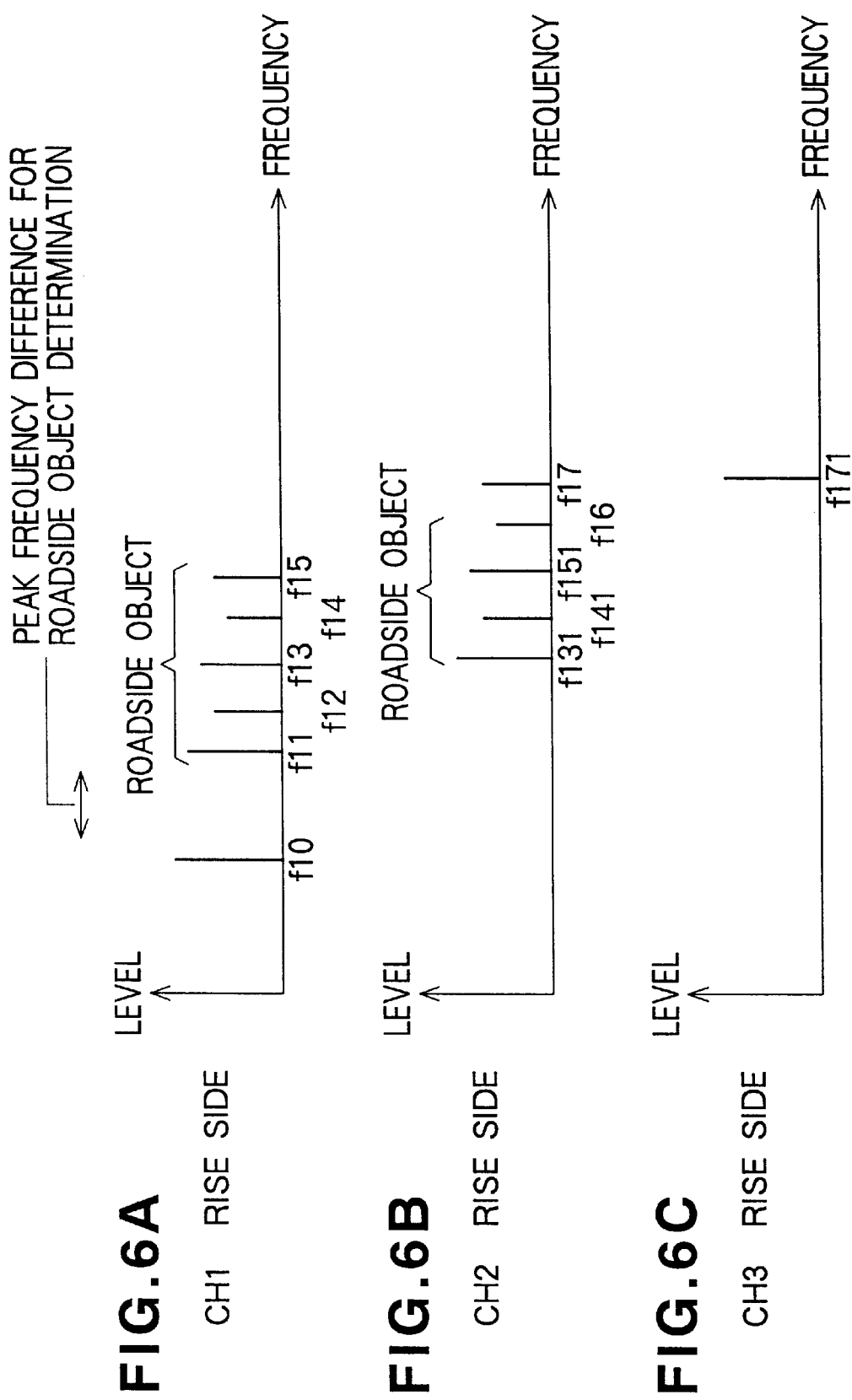

PEAK DATA
(RISE SIDE)

PEAK DATA
(FALL SIDE)

DETECTED POSITIONS
(CALCULATED RESULTS)

PEAK DATA
(RISE SIDE)

PEAK DATA
(FALL SIDE)

DETECTED POSITIONS
(CALCULATED RESULTS)

RADAR DEVICE

BACKGROUND OF THE INVENTION

1. Field of the Invention

The present invention relates generally to a radar device used in a vehicle, and more particularly to a radar device which, in detecting distances and relative speeds with respect to a plurality of vehicles in front of a vehicle mounting the radar device using an FM-CW radar, excludes roadside objects such as crash barriers (guard rails), sound-insulating walls and wire netting disposed continuously along the sides of a road.

2. Description of the Related Art

Known instruments for measuring distances between objects and their relative speeds include measuring devices using Frequency-Modulated-Continuous-Wave (FM-CW) radar. These devices transmit a modulated wave of a predetermined modulation amplitude whose frequency rises and falls periodically, receive a reflected wave reflected by an object, and detect a difference between the frequency of the transmitted wave and the frequency of the received wave as a beat spectrum; if a beat frequency in a transmitted frequency rise period (hereinafter, rise side) and a beat frequency in a transmitted frequency fall period (hereinafter, fall side) are obtained for an object, the distance to that object and its relative speed can be obtained by calculation.

However, when there are a plurality of objects, because a plurality of beat frequencies arise, it is necessary for rise side and fall side beat frequencies to be correctly associated for each object. In particular, when there is a roadside object consisting of a crash barrier (guard rail), a sound-insulating wall or wire netting disposed continuously along the side of the road, numerous peaks arise in the beat spectrum due to reflected signals from this roadside object. As a vehicle radar device able to recognize a preceding vehicle constituting an obstruction from these multiple peak spectra, there is for example the radar device disclosed in Japanese Patent Laid-Open Publication No. HEI-7-98375.

This radar device uses an FM-CW radar to detect a rise side spectrum A and a fall side spectrum B for an obstruction. In view of the fact that in the case of a stationary body the spectrum A and the spectrum B will have a frequency difference corresponding to the speed of the vehicle, the fall side spectrum is shifted in correspondence with the vehicle speed to produce a spectrum C and this is subtracted from the spectrum A to produce a spectrum D from which spectral peaks pertaining to the stationary body have been removed. This spectrum D is then subtracted from the spectrum A to obtain a spectrum E consisting only of spectral peaks pertaining to the stationary body. Objects whose spectrum intensity is not maintained continuously in the spectrum E are excluded from the obstruction and thereby the obstruction is recognized.

Another known vehicle radar device (Japanese Patent Laid-Open Publication No. HEI-7-234277) obtains peak frequencies on the basis of frequency analysis of a beat signal; obtains deviations between the peak frequencies and their adjacent peak frequencies; obtains the minimum levels between the peak frequencies; and correctly distinguishes vehicles and roadside objects by making correlations between the deviations and the minimum levels.

However, in either of these radar devices, because numerous peaks arise in the beat spectrum, as mentioned above, there are a great many combinations of rise side beat frequencies and fall side beat frequencies and consequently a large amount of processing is required to obtain the correct combinations (pairings). Also, the probability of making wrong combinations (pairings) is high.

For example, as shown in FIG. 9, a radar signal processing device may for each beam emitted perform pairing of a peak frequency detected on the rise side and a peak frequency detected on the fall side and calculate the distance to an object and its relative speed on the basis of the paired peak frequencies.

The radar signal processing device shown in FIG. 9 is made up of a signal inputting part (A/D convertor) 101, a frequency analyzing part (FFT part) 102, a peak detecting part 103, a distance and relative speed calculating part (pairing part) 104, a clustering part 105 and a targeting part 106.

The signal inputting part (A/D convertor) 101 converts a beat signal outputted from a radar unit proper (not shown) and supplies a digital beat signal to the frequency analyzing part (FFT part) 102. The frequency analyzing part (FFT part) 102 carries out frequency analysis (spectral analysis) of the digital beat signal by performing high-speed Fourier conversion processing on the digital beat signal, and outputs frequency analysis (spectral analysis) data. The peak detecting part 103 detects peaks of the beat signal on the basis of the frequency analysis (spectral analysis) data, and supplies peak frequencies to the distance and relative speed calculating part (pairing part) 104.

The distance and relative speed calculating part (pairing part) 104 performs pairing of a peak frequency detected on the rise side and a peak frequency detected on the fall side for each beam emission direction and calculates the distance to an object and its relative speed on the basis of the paired peak frequencies. When multiple peaks are detected, a distance and a relative speed are calculated for every one of multiple combinations, and a most suitable combination is determined from the calculated distance and relative speed results. The clustering part 105 groups data (distances and relative speeds) relating to the same object on the basis of the distances and relative speeds detected for each beam emission direction. The targeting part 106 calculates a center position and a bearing of the center of each object on the basis of the peak levels detected for each beam emission direction, calculates the width of the object and outputs the position (distance and bearing), relative speed and width of each object.

When due to the existence of a roadside object multiple peaks pertaining to the roadside object are detected, because the distance and relative speed calculating part (pairing part) 104 must calculate a distance and a relative speed for every one of multiple combinations and determine the most suitable combination from the calculated distance and relative speed results, this pairing processing is time-consuming. Also, because there are many different combinations, incorrect combinations may be selected. That is, wrong pairings may arise. Consequently, the time taken for the final outputting of the position, relative speed and width and so on of each object is long, and when a wrong pairing is made the detection accuracy of the positions, relative speeds and widths deteriorates.

SUMMARY OF THE INVENTION

It is therefore an object of the present invention to provide a radar device which on the basis of characteristics of peak spectra of a beat signal arising due to signals reflected from roadside objects (guard rails, sound-insulating walls, wire netting, etc.) removes the peak spectra of the roadside objects and thereby reduces the amount of processing (pairing processing) needed to pair beat frequencies of times of rising transmitted frequency with beat frequencies of times of falling transmitted frequency and reduces wrong pairings and which increases processing efficiency by eliminating the need for distance and relative speed calculations to be carried out for roadside objects.

According to a first aspect of the present invention, there is provided a radar device for radiating light, ultrasound or radio waves toward an object and receiving a reflected signal from the object and detecting the position of the object on the basis of this received signal, the radar device comprising a stationary object identifier for detecting densities of peaks in the received signal and identifying peak groups having a peak density higher than a predetermined value as stationary objects.

With this radar device, fixed roadside objects such as crash barriers (guard rails), sound-insulating walls and wire netting disposed continuously along the side of the road are identified on the basis of the received signal as stationary objects, which register a high peak density, and traveling vehicles, which register a low peak density, can thereby be distinguished from roadside objects; thus it is possible for received signals relating to traveling vehicles to be processed efficiently by roadside objects being excluded as objects of detection.

According to a second aspect of the present invention, there is provided a radar device for transmitting a modulated wave whose frequency rises and falls periodically with a predetermined modulation amplitude and receiving a reflected wave reflected by an object and detecting a difference between the frequency of the transmitted wave and the frequency of the received wave as a beat spectrum, the radar device comprising a stationary object identifier for detecting densities of peaks in the beat spectrum and identifying peak groups having a peak density higher than a predetermined value as stationary objects and a stationary object eliminator for eliminating data of peak groups identified as stationary objects by the stationary object identifier.

The stationary object identifier identifies peak groups having a peak density equal to or greater than a predetermined value as stationary objects. It is known from experiments that peak spectra of roadside objects such as sound-insulating walls and guard rails of expressways have multiple successive peaks whose peak density in a predetermined frequency range is greater than that of a vehicle or the like. Therefore, it is possible to detect stationary roadside objects on the basis of peak density. By excluding peaks of a beat spectrum identified as a stationary roadside object from processing (pairing processing) combining beat frequencies of times of rising transmitted frequency with beat frequencies of times of falling transmitted frequency it is possible to reduce the load of this processing and reduce wrong pairings, and by eliminating the need for distance and relative speed calculations to be carried out for roadside objects it is possible for processing efficiency to be improved.

According to a third aspect of the present invention, there is provided a radar device for transmitting a modulated wave whose frequency rises and falls periodically with a predetermined modulation amplitude and receiving a reflected wave reflected by an object and detecting a difference between the frequency of the transmitted wave and the frequency of the received wave as a beat spectrum, the radar device comprising a roadside object detector for detecting roadside objects on the basis of characteristics of peak spectra of a beat signal arising due to signals reflected from those roadside objects.

Desirably, this radar device also comprises a roadside object eliminator for eliminating peak spectra pertaining to roadside objects detected by the roadside object detector.

Because the roadside object detector detects roadside objects on the basis of characteristics of peak spectra of a beat signal arising due to signals reflected from the roadside objects, it can detect roadside objects precisely. And by peaks of beat spectra detected as roadside objects being eliminated from processing (pairing processing) combining beat frequencies of times of rising transmitted frequency with beat frequencies of times of falling transmitted frequency it is possible to reduce the load of this processing and reduce wrong pairings, and by eliminating the need for distance and relative speed calculations to be carried out for roadside objects it is possible for processing efficiency to be improved.

BRIEF DESCRIPTION OF THE DRAWINGS

Certain preferred embodiments of the invention will now be described in detail, by way of example only, with reference to the accompanying drawings, in which:

FIG. 3 is a block diagram of an FM-CW radar device according to the invention showing functions of a radar signal processing part in detail;

FIG. 4A is an overhead view illustrating relationships of a preceding vehicle and a roadside object to an own vehicle, and FIG. 4B shows peak spectra for identifying the roadside object and the preceding vehicle;

FIGS. 5A through 5D are views illustrating continuous roadside object detection processing and roadside object elimination processing carried out in a roadside object processing part, FIG. 5A showing a peak spectrum detected on the rise side in a beam emission direction CH1, FIG. 5B showing a peak spectrum detected on the rise side in a beam emission direction CH2, FIG. 5C showing a peak spectrum detected on the fall side in the beam emission direction CH1, and FIG. 5D showing a peak spectrum detected on the fall side in the beam emission direction CH2;

FIGS. 6A through 6C are further views illustrating roadside object detection processing and roadside object elimination processing carried out in a roadside object processing part, FIG. 6A showing a peak spectrum detected on the rise side in a beam emission direction CH1, FIG. 6B showing a peak spectrum detected on the rise side in a beam emission direction CH2, and FIG. 6C showing a peak spectrum detected on the rise side in a beam emission direction CH3;

DETAILED DESCRIPTION OF THE PREFERRED EMBODIMENTS

The following description is merely exemplary in nature and is in no way intended to limit the invention or its application or uses.

Figure 1A:
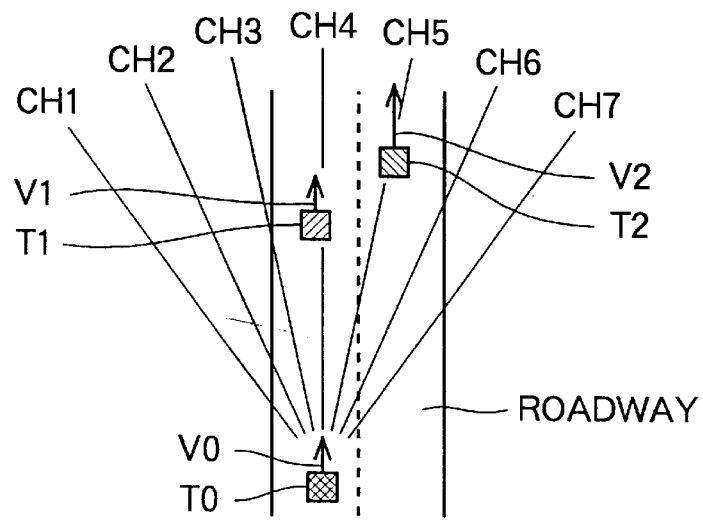
FIGS. 1A, 1B and 1C are overhead views illustrating an example of peak spectrum data obtained when there are no roadside objects, FIG. 1A showing the relationship between an own vehicle and a plurality of other traveling vehicles and emission directions of a plurality of beams, FIG. 1B schematically showing peak spectra of rise side beat signals, and FIG. 1C schematically showing peak spectra of fall side beat signals.
Figure 1B:
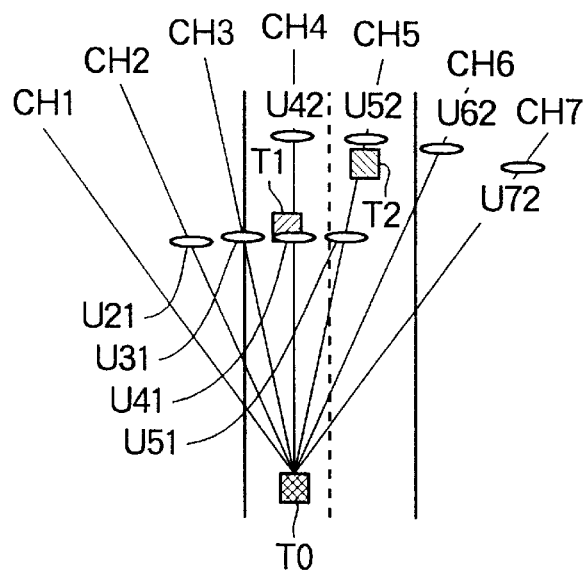
Figure 1C:
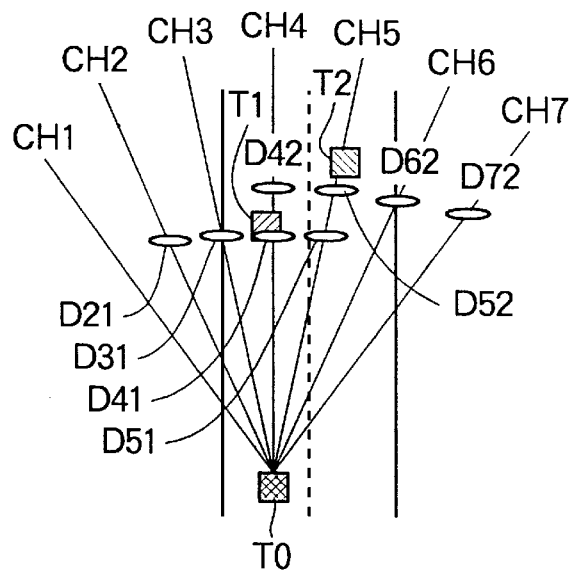

Reference is initially made to FIG. 1A, FIG. 1B and FIG. 1C showing an example of peak spectrum data obtained when there are no roadside objects.

FIG. 1A shows relationships between an own vehicle T0 equipped with multiple beam FM-CW radar and preceding vehicles T1 and T2, and emission directions (beam center directions) CH1 through CH7 of beams having a predetermined width. The speed V0 of the own vehicle T0 and the speed V1 of the first preceding vehicle T1 are approximately the same. The second preceding vehicle T2 is traveling at a speed V2 which is considerably faster than the speed V0 of the own vehicle T0.

FIG. 1B schematically shows peak spectra of the rise side beat signal. Here, the peak spectra (peak frequencies) are shown schematically by elliptical marks drawn in distance positions corresponding to the peak frequencies of the peak spectra. The numeral U21 denotes the peak spectrum of the first preceding vehicle T1 detected in the beam direction CH2. The numeral U31 denotes the peak spectrum of the first preceding vehicle T1 detected in the beam direction CH3. The numeral U41 denotes the peak spectrum of the first preceding vehicle T1 detected in the beam direction CH4. The numeral U51 denotes the peak spectrum of the first preceding vehicle T1 detected in the beam direction CH5. The numeral U42 denotes the peak spectrum of the second preceding vehicle T2 detected in the beam direction CH4. The numeral U52 denotes the peak spectrum of the second preceding vehicle T2 detected in the beam direction CH5. The numeral U62 denotes the peak spectrum of the second preceding vehicle T2 detected in the beam direction CH6. The numeral U72 denotes the peak spectrum of the second preceding vehicle T2 detected in the beam direction CH7.

FIG. 1C schematically shows peak spectra of the fall side beat signal. Here again, the peak spectra are shown schematically by elliptical marks drawn in distance positions corresponding to the peak frequencies of the peak spectra. The numeral D21 denotes the peak spectrum of the first preceding vehicle T1 detected in the beam direction CH2. The numeral D31 denotes the peak spectrum of the first preceding vehicle T1 detected in the beam direction CH3. The numeral D41 denotes the peak spectrum of the first preceding vehicle T1 detected in the beam direction CH4. The numeral D51 denotes the peak spectrum of the first preceding vehicle T1 detected in the beam direction CH5. The numeral D42 denotes the peak spectrum of the second preceding vehicle T2 detected in the direction of the beam direction CH4. The numeral D52 denotes the peak spectrum of the second preceding vehicle T2 detected in the beam direction CH5. The numeral D62 denotes the peak spectrum of the second preceding vehicle T2 detected in the beam direction CH6. The numeral D72 denotes the peak spectrum of the second preceding vehicle T2 detected in the beam direction CH7.

Because the relative speed of the first preceding vehicle T1 with respect to the own vehicle T0 is approximately zero, the peak spectra U21, U31, U41, U51, D21, D31, D41, D51 detected in the beam directions CH2 through CH5 are not influenced by any Doppler shift (Doppler frequency=0) and the peak spectrum positions (peak frequencies) detected on the rise side and the peak spectrum positions (peak frequencies) detected on the fall side have substantially the same values.

Because the second preceding vehicle T2 is traveling at a speed V2 which is considerably faster than the speed V0 of the vehicle T0, on the other hand (because second preceding vehicle T2 is moving away from the own vehicle T0), the peak spectra U42, U52, U62, U72, D42, D52, D62 and D72 detected in the beam directions CH4 through CH7 are influenced by a Doppler shift. Consequently, on the rise side the peak frequencies are higher than the frequency corresponding to the distance by the amount of the Doppler frequency corresponding to the relative speed, and on the fall side the peak frequencies are lower than the frequency corresponding to the distance by the amount of the Doppler frequency corresponding to the relative speed.

In the beam direction CH2, since one peak spectrum U21 is detected on the rise side and one peak spectrum D21 is detected on the fall side, there is only one combination of a rise side peak frequency and a fall side peak frequency. And also in the beam direction CH6 and the beam direction CH7, since only one peak frequency is detected on each of the rise side and the fall side, there is only one combination of a rise side peak frequency and a fall side peak frequency.

In the beam direction CH4 and the beam direction CH5, on the other hand, because two peak frequencies are detected on each of the rise side and the fall side, there are four possible combinations of a rise side peak frequency and a fall side peak frequency. Accordingly, calculation of distance and relative speed is carried out for all of the four combinations, from the four calculation results the values most suitable as distances and relative speeds of vehicles are selected, and processing to adopt as valid combinations the combinations of a rise side peak frequency and a fall side peak frequency with which the most suitable distances and relative speeds are obtained is carried out.

Figure 2A:
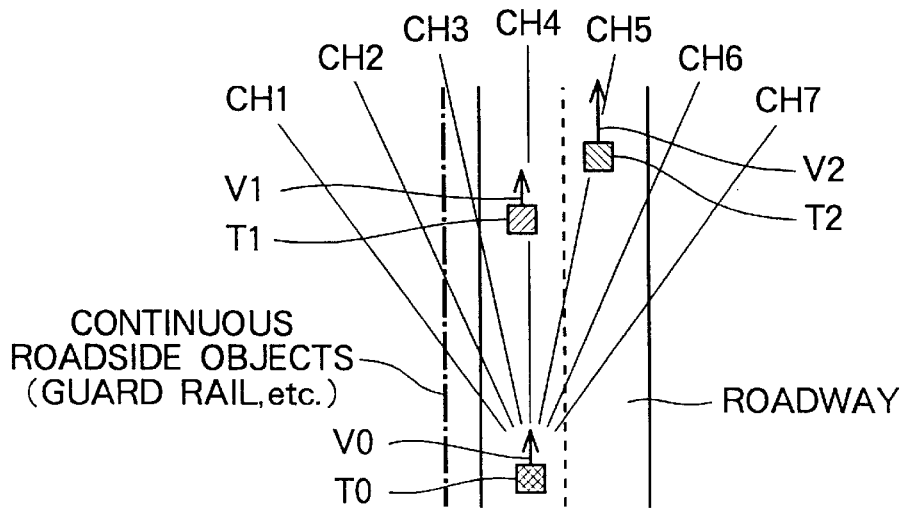
FIGS. 2A, 2B and 2C are overhead views illustrating an example of peak spectrum data obtained when there is a continuous roadside object at the side of the roadway, FIG. 2A showing a case wherein a roadside object is disposed to the left of the traveling direction of the own vehicle, FIG. 2B schematically showing peak spectra pertaining to the roadside object detected on the rise side, and FIG. 2C schematically showing peak spectra pertaining to the roadside object detected on the fall side.
Figure 2B:
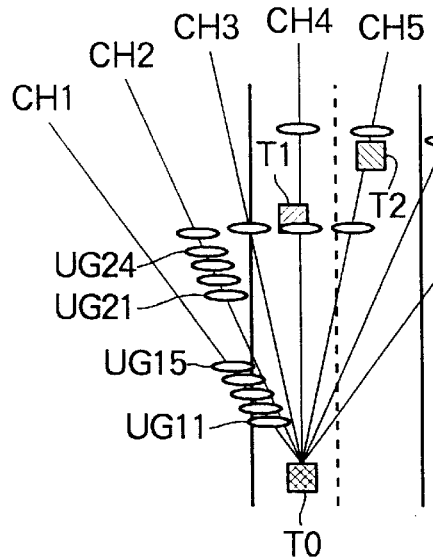
Figure 2C:
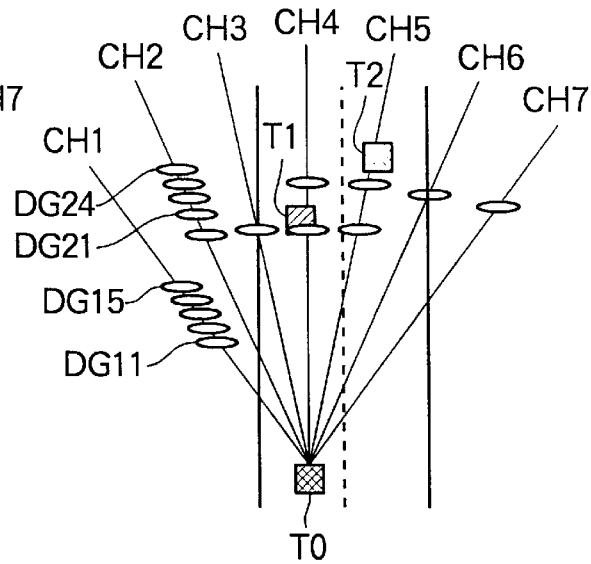

FIGS. 2A, 2B and 2C show an example of peak spectrum data obtained when there is a roadside object.

FIG. 2A shows a case wherein there is a continuous roadside object such as for example a guard rail on the left side of the traveling direction of the own vehicle T0. In this case, as shown in FIG. 2B and FIG. 2C, a plurality of peak spectra UG11 through UG15, UG21 through UG24, DG11 through DG15 and DG21 through DG24 corresponding to the roadside object arise.

Although FIG. 2B and FIG. 2C show an example wherein the number of peaks pertaining to the roadside object detected on the rise side and the number of peaks pertaining to the roadside object detected on the fall side are the same, the numbers of peaks detected on the rise side and on the fall side sometimes differ.

Because the roadside object is a stationary object and the own vehicle T0 is traveling at the speed V0, the relative speed of the own vehicle T0 with respect to the roadside object is the speed V0. Therefore, the peak frequencies corresponding to the roadside object are influenced by a Doppler frequency corresponding to the speed V0. Consequently, the peak frequencies on the rise side are lower than the frequency corresponding to the distance by the amount of the Doppler frequency corresponding to the relative speed, and on the fall side the peak frequencies are higher than the frequency corresponding to the distance by the amount of the Doppler frequency corresponding to the relative speed (UG11 through UG15; DG11 through DG15).

FIG. 3 is a block function diagram of a radar device according to the invention. This radar device 1 is made up of an FM-CW radar unit proper 2 and a radar signal processing part 3.

Figure 9:
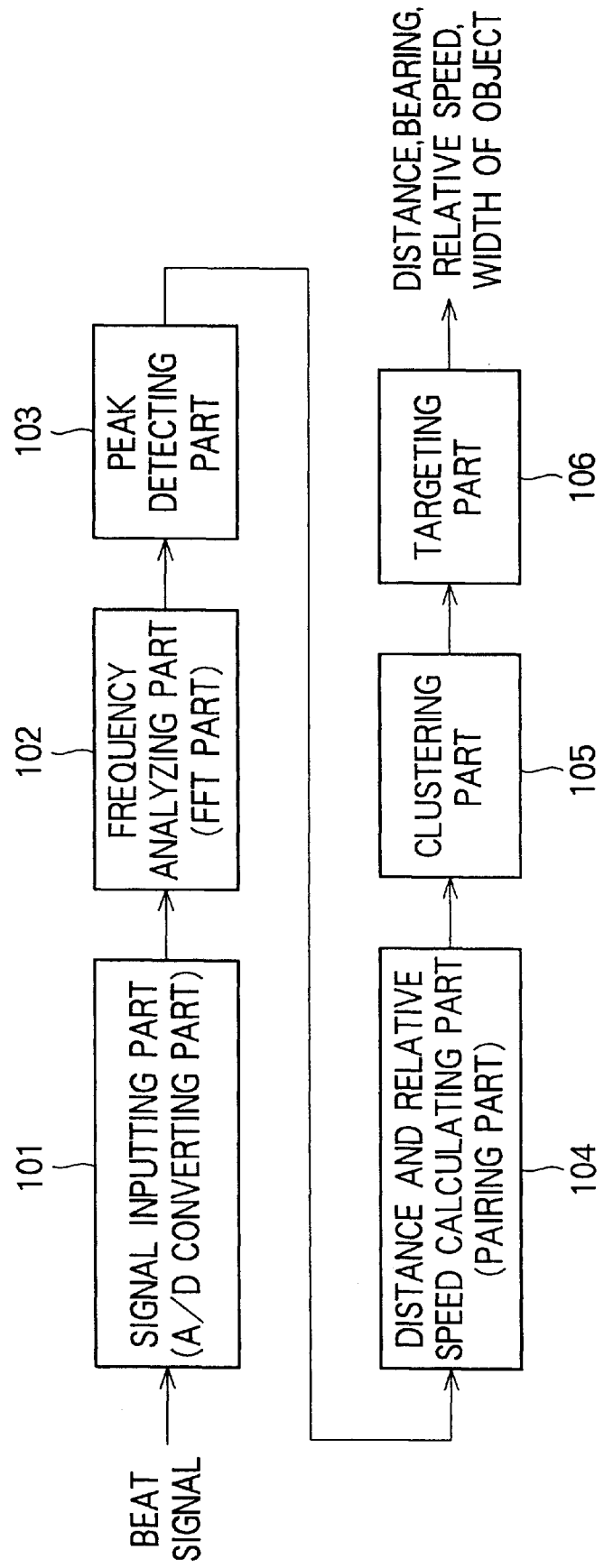
FIG. 9 is a block diagram showing the construction of a radar signal processing part of a related art radar device.

The radar signal processing part 3 is made up of a signal inputting part (A/D converting part) 11, a frequency analyzing part (FFT part) 12, a peak detecting part 13, a roadside object processing part 10, a distance and relative speed calculating part (pairing part) 14, a clustering part 15 and a targeting part 16. The radar signal processing part 3 consists of the related art radar signal processing part shown in FIG. 9 with the addition of the roadside object processing part 10, and therefore the rest of its construction is the same as that of the related art radar signal processing part shown in FIG. 9.

The FM-CW radar unit proper 2 transmits a modulated wave whose frequency rises and falls periodically with a predetermined modulation amplitude and receives a reflected wave reflected by an object and outputs a beat signal pertaining to the difference in frequency between the frequency of the transmitted wave and the frequency of the received wave. The FM-CW radar unit proper 2 is of a multiple beam type construction such that it detects objects in different directions either by emitting a plurality of beams in a number of directions simultaneously or by emitting a single beam while scanning it to a number of directions and receiving a received wave from each of the directions. In this invention, a method wherein a high-frequency transmitted beam is scanned continuously by mechanical means may alternatively be employed.

The signal inputting part (A/D converting part) 11 A/D-converts the beat signal outputted from the multiple beam FM-CW radar unit proper 2 and supplies a digital beat signal to the frequency analyzing part (FFT part) 12.

The frequency analyzing part (FFT part) 12 carries out frequency analysis (spectral analysis) of the digital beat signal by performing high-speed Fourier conversion processing on the digital beat signal, and outputs frequency analysis (spectral analysis) data. The frequency analyzing part (FFT part) 12 outputs frequency analysis (spectral analysis) data in association with information indicating the beam direction CHn and whether rise side or fall side.

The peak detecting part 13 detects peaks of the beat signal on the basis of the frequency analysis (spectral analysis) data. When there are a plurality of peaks, the peak detecting part 13 detects all of those peaks. This peak detecting part 13 outputs the frequencies (the peak frequencies) and the levels (peak levels) of the detected peaks in association with each other. Also, the peak detecting part 13 outputs the peak frequencies and the peak levels in association with information indicating the beam direction CHn and whether rise side or fall side.

The roadside object processing part 10 performs identification of roadside objects and removal of peaks pertaining to roadside objects for each beam direction CHn and for each of the rise side and the fall side. That is, the roadside object processing part 10 first carries out identification of roadside objects and removal of peaks pertaining to roadside objects on the basis of peak data (peak frequencies and peak levels) on the rise side in the beam direction CH1, then carries out identification of roadside objects and removal of peaks pertaining to roadside objects on the basis of peak data (peak frequencies and peak levels) on the fall side in the beam direction CH1, and then successively carries out identification of roadside objects and removal of peaks pertaining to roadside objects for each of the other beam directions CH2, CH3, . . . CHn.

The roadside object processing part 10 counts the number of peaks (the peak count) detected on the rise side. When the peak count of the rise side is not more than a preset permissible peak count (for example three), it outputs the peak data directly and does not execute peak removal processing. When the peak count on either the rise side or the fall side exceeds the permissible peak count (for example three), the roadside object processing part 10 infers that a roadside object (including structures of a median strip) has been detected in that beam direction and carries out processing to detect the density of the peaks, which will be discussed next.

The roadside object processing part 10 obtains the frequency differences (gaps) between the peaks for the plurality of peaks detected on the rise side. The peak frequency differences between the peaks correspond to distance differences between the own vehicle and detected objects. The roadside object processing part 10 groups together peaks within a preset frequency difference for roadside object identification (for example a frequency difference corresponding to a distance of 10 meters). That is, it groups together peaks between which the peak frequency gaps are small and whose density is thus high and identifies them as stationary objects. The roadside object processing part 10 identifies groups of grouped peaks as stationary objects such as roadside objects.

In this kind of method of identifying roadside objects using peak density as a reference, when for example as in the case shown in FIG. 4A the relative speed of traveling vehicles (V1, V0) with respect to a roadside object is large and the speed of a preceding vehicle (V1) relative to an own vehicle (V0) is small, the detected peak data is detected as shown in FIG. 4B. That is, even if spectrum data of the stationary object (roadside object) and the preceding vehicle (V1) overlap, by calculating the gaps between the peaks, i.e. the peak density, of each object, it is possible to group together high-density peak groups and detect these as roadside objects and eliminate these roadside objects.

To improve reliability, the roadside object processing part 10 checks that no peaks registered by an object other than a roadside object are included in the grouped peak groups. This check is carried out on the basis of peak data of an adjacent beam direction. Here, the adjacent beam direction is the beam direction which is adjacent on the inner side. For example, when a peak group pertaining to a roadside object is detected in the beam direction CH1 shown in FIG. 2A, FIG. 2B and FIG. 2C, whether or not peaks pertaining to a vehicle or the like are included in that peak group is checked on the basis of the peak data of the beam direction CH2, which is on the inner side of the beam direction CH1. And when for example a peak group pertaining to a median strip is detected in the beam direction CH5, whether or not peaks pertaining to a vehicle or the like are included in that peak group is checked on the basis of the peak data of the beam direction CH4, which is on the inner side of the beam direction CH5.

When in the peak data of the adjacent beam direction there is no data of a peak frequency the same as or approximately the same as a respective grouped peak frequency, the roadside object processing part 10 infers that the peak data of the grouped peak group is peak data of a roadside object and eliminates it. When in the peak data of the adjacent beam direction there is data of a peak frequency the same as or approximately the same as a respective grouped peak frequency and furthermore this peak frequency the same as or approximately the same as a respective grouped peak frequency exists independently (exists beyond a peak frequency difference for roadside object identification as data of a roadside object, for example a frequency difference corresponding to a distance of 10 meters), the roadside object processing part 10 determines that the peak data to which this peak frequency of the same frequency or approximately the same frequency in the adjacent beam direction corresponds is not a roadside object and excludes it from grouping, and eliminates the peak data other than that as data of a roadside object. When in the peak data of the adjacent beam direction there is data of peak frequencies the same as or approximately the same as respective grouped peak frequencies but the peaks of the adjacent beam direction do not exist independently (in other words, when peaks pertaining to the roadside object are detected in the adjacent beam direction also), the roadside object processing part 10 identifies the grouped peak group as a roadside object and eliminates its peak data.

The roadside object processing part 10 removes the peak data identified as a roadside object and outputs the remaining peak data in association with information indicating the beam direction CHn and whether rise side or fall side. This roadside object processing part 10 constitutes a stationary object identifier and a stationary object eliminator, and a roadside object detector and a roadside object eliminator, referred to elsewhere in the invention.

The roadside object processing part 10 may alternatively have a roadside object spectrum data storing part in which spectrum data having characteristics of roadside objects is prestored, a degree of correlation calculating part for obtaining degrees of correlation between prestored spectrum data having characteristics of roadside objects and peak data supplied from the peak detecting part 13, and a roadside object eliminator for eliminating peak data pertaining to roadside objects actually detected on the basis of the degrees of correlation.

Spectrum data obtained when typical roadside objects (for example, guard rails, sound-insulating walls, wire netting, median strips and so on) are detected by the FM-CW radar unit proper 2 are stored in the roadside object spectrum data storing part. The degree of correlation calculating part specifies a type of roadside object by making correlations between spectrum data pertaining to different kinds of roadside object stored in the roadside object spectrum data storing part and peak data supplied from the peak detecting part 13 and obtains a degree of correlation between spectrum data pertaining to the specified roadside object and peak data supplied from the peak detecting part 13. The roadside object eliminator removes peak data pertaining to roadside objects from the peak data supplied from the peak detecting part 13 on the basis of the degree of correlation.

The distance and relative speed calculating part (pairing part) 14 carries out combining (pairing) of a peak frequency detected on the rise side and a peak frequency detected on the fall side for each beam direction on the basis of the peak data from which peak data pertaining to roadside objects has been removed by the roadside object processing part 10 and calculates a distance to the object and its relative speed on the basis of each of the paired peak frequencies. When multiple peaks are detected, the distance and relative speed calculating part (pairing part) 14 calculates a distance and a relative speed for each one of multiple combinations and determines a most suitable combination from the calculated distance and relative speed results.

The clustering part 15 groups data (distances and relative speeds) from the same object on the basis of the distances and relative speeds detected for each beam direction.

The targeting part 16 calculates a center position and a center bearing of each object on the basis of the peak levels detected for each beam direction and calculates the width of the object and outputs signals of the position (distance and bearing), relative speed, and width of each object.

FIGS. 5A through 5D are charts illustrating the operation of roadside object detection processing and roadside object elimination processing in the roadside object processing part. FIG. 5A shows a peak spectrum detected on the rise side in the beam direction CH1. FIG. 5B shows a peak spectrum detected on the rise side in the beam direction CH2. FIG. 5C shows a peak spectrum detected on the fall side in the beam direction CH1. FIG. 5D shows a peak spectrum detected on the fall side in the beam direction CH2.

As shown in FIG. 5A, when five peaks have been detected (at peak frequencies fa, fb, fc, fd and fe) on the rise side in the beam direction CH1 and the differences between the peak frequencies are within the peak frequency difference for roadside object determination (for example a frequency difference corresponding to a distance of 10 meters), the five peaks are grouped together as a roadside object.

And when as shown in FIG. 5B no peaks at a peak frequency corresponding to any of the peak frequencies fa, fb, fc, fd and fe are detected in the spectrum of the rise side of the adjacent beam direction CH2, the peak data pertaining to the five peaks (the peak frequencies fa, fb, fc, fd and fe) is eliminated.

As shown in FIG. 5C, when five peaks (at peak frequencies f1, f2, f3, f4 and f5) have been detected on the fall side in the beam direction CH1 and the differences between the peak frequencies are within the peak frequency difference for roadside object determination (for example a frequency difference corresponding to a distance of 10 meters), the five peaks are grouped together as a roadside object.

And when as shown in FIG. 5D no peaks at a peak frequency corresponding to any of the peak frequencies f1 through f5 are detected in the spectrum of the fall side in the adjacent beam direction CH2, the peak data pertaining to the five peaks (the peak frequencies f1 through f5) is eliminated.

FIGS. 6A through 6C are further views illustrating the operation of roadside object detection processing and roadside object elimination processing in the roadside object processing part. FIG. 6A shows a peak spectrum detected on the rise side in the beam direction CH1. FIG. 6B shows a peak spectrum detected on the rise side in the beam direction CH2. FIG. 6C shows a peak spectrum detected on the rise side in the beam direction CH3.

In FIG. 6A, six peaks have been detected. Of these, because a peak frequency f10 and a peak frequency f11 are apart by more than the peak frequency difference for roadside object determination, the peak frequency f10 is left as an independent peak. The five peaks at peak frequencies f11 through f15, on the other hand, because the differences between these peak frequencies are smaller than the peak frequency difference for roadside object determination, are grouped together as a roadside object. Peaks (f131, f141 and f151 shown in FIG. 6B) having approximately the same peak frequencies as the peak frequencies f13, f14 and f15 have been detected in the adjacent beam direction CH2, but because the peaks detected in the adjacent beam direction CH2 are also identified as a roadside object, the peak data (f11 through f15) grouped as a roadside object in the beam direction CH1 is eliminated.

In FIG. 6B, because the differences between the peak frequencies of the peaks f131, f141, f151, f16 and f17 are smaller than the peak frequency difference for roadside object determination, these peaks are grouped together as a roadside object; however, because in the adjacent beam direction CH3 an independent peak (the peak frequency f171 shown in FIG. 6C) has been detected and the peak frequency f17 detected in the beam direction CH2 and the peak frequency f171 detected in the beam direction CH3 are approximately the same frequency, it is inferred that there is a possibility of the peak frequency f17 detected in the beam direction CH2 being a signal reflected from a preceding vehicle or the like and therefore it is left as an independent peak. As a result, among the peaks detected in the beam direction CH2, the peak data of the peaks other than the peak frequency f17, i.e. of the peaks f131, f141, f151 and f16, is eliminated.

Figure 7A:
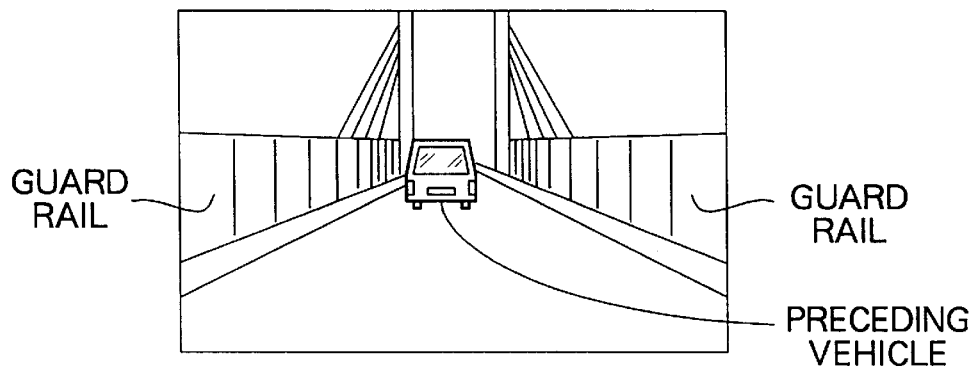
FIGS. 7A through 7D are views illustrating an example of preceding vehicle and roadside object detection in a case wherein roadside object detection processing and roadside object elimination processing are not carried out, FIG. 7A showing the road environment of an own vehicle traveling behind one preceding vehicle on a bridge having guard rails on both sides of the roadway, FIG. 7B showing peak frequencies of the roadside objects and the preceding vehicle detected on the rise side, FIG. 7C showing peak frequencies of the roadside objects and the preceding vehicle detected on the fall side, and FIG. 7D showing calculated results obtained after rise side-fall side pairing is carried out.
Figure 7B:
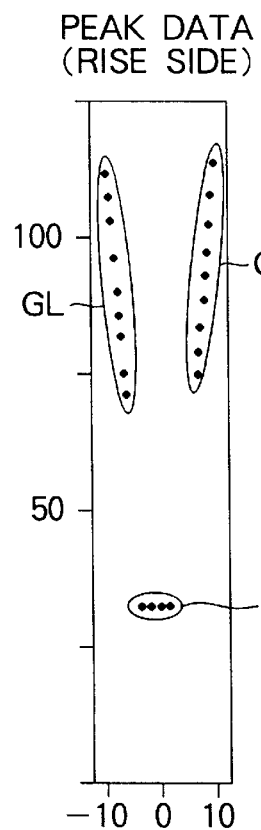
Figure 7C:
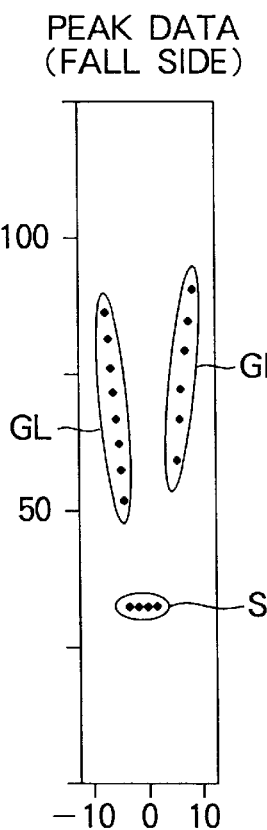
Figure 7D:
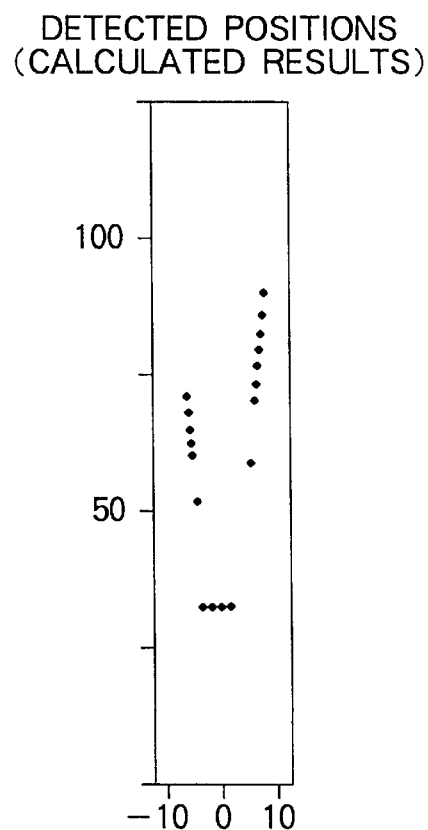
Figure 8A:
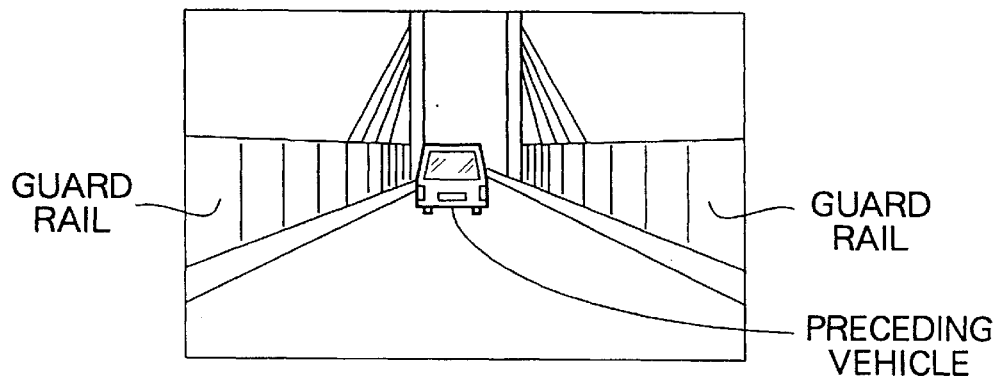
FIGS. 8A through 8D are views illustrating a detection example in a case wherein roadside object detection processing and roadside object elimination processing are carried out, FIG. 8A showing the road environment of an own vehicle traveling behind one preceding vehicle on a bridge having guard rails on both sides of the roadway, FIG. 8B showing peak frequencies of the roadside objects and the preceding vehicle detected on the rise side, FIG. 8C showing peak frequencies of the roadside objects and the preceding vehicle detected on the fall side, and FIG. 8D showing calculated results obtained after rise side-fall side pairing is carried out.
Figure 8B:
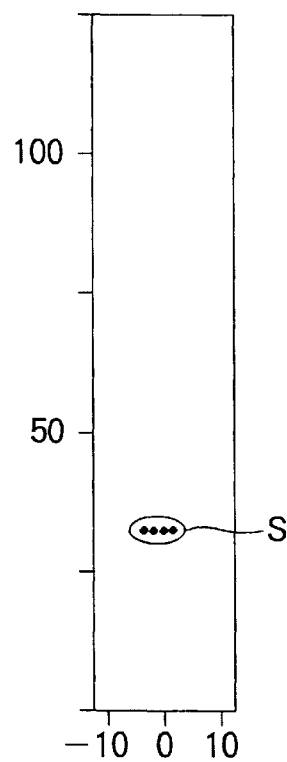
Figure 8C:
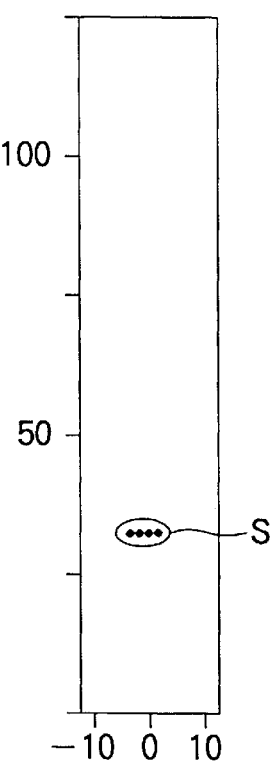
Figure 8D:
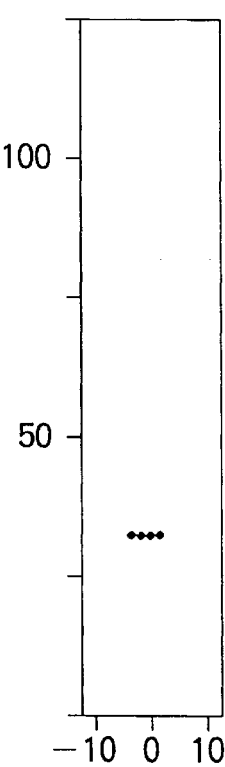

FIGS. 7A through 7D and FIGS. 8A through 8D show an example of detection of a preceding vehicle and a roadside object. FIGS. 7A through 7D show a case wherein roadside object detection processing and roadside object removal processing are not carried out, and FIGS. 8A through 8D show a case wherein roadside object detection processing and roadside object removal processing have been carried out. FIG. 7A and FIG. 8A show a road environment of an own vehicle traveling behind one preceding vehicle on a bridge having guard rails on both sides of the roadway. FIG. 7B and FIG. 8B show peak data (peak frequencies) detected on the rise side in positions corresponding to the peak frequencies. FIG. 7C and FIG. 8C show peak data (peak frequencies) detected on the fall side in positions corresponding to the peak frequencies. FIG. 7D and FIG. 8D show positions of objects calculated on the basis of results of pairing processing. In FIG. 7B through FIG. 7D and FIG. 8B through FIG. 8D, the vertical axis shows in meters the distance from the own vehicle to the guard rails in front, and the horizontal axis shows in meters the spacing of the guard rails.

When the own vehicle is traveling across a bridge having guard rails on both sides of the roadway, signals reflected by the guard rails are received by the radar device. Consequently, as shown in FIG. 7B and FIG. 7C, a peak data group GL pertaining to the left side guard rail and a peak data group GR pertaining to the right side guard rail are detected. The numeral S denotes a peak data group pertaining to the preceding vehicle. The peak data pertaining to the left and right guard rails has numerous peaks, and often the numbers of peaks on the rise side and the fall side are different. Consequently, the pairing processing takes a long time. Also, wrong pairings are liable to arise. As a result, it takes much time to obtain the calculation results shown in FIG. 7D. By carrying out roadside object detection processing and roadside object removal processing, on the other hand, as shown in FIG. 8B and FIG. 8C, it is possible to remove peak data pertaining to roadside objects and obtain only peak data pertaining to the preceding vehicle S. Thus it is possible for pairing processing and distance and relative speed calculation processing to be carried out in a short time.

Although the invention has been described here using the example of millimeter wave band FM-CW radar, the invention can also be applied for example to laser radar, millimeter wave band pulse or Doppler radar, or ultrasound radar.

As described above in detail, because a radar device according to the invention is constructed to carry out processing (pairing processing) combining a beat frequency of a frequency rise period and a beat frequency of a frequency fall period and calculate a distance and a relative speed after removing peak data pertaining to roadside objects on the basis of characteristics of peak spectra of roadside objects, the amount of processing required to pair rise side beat frequencies with fall side beat frequencies can be reduced and the need to carry out distance and relative speed calculations for roadside objects can be eliminated. Thus it is possible to improve processing efficiency and reduce wrong pairings.

Obviously, various minor changes and modifications of the present invention are possible in the light of the above teaching. It is therefore to be understood that within the scope of the appended claims the present invention may be practiced otherwise than as specifically described.

What is claimed is:

1. A method of radar signal processing within a radar device, comprising the steps of:

transmitting a frequency-modulated signal to form a first beam;

beating a signal received from the first beam with the transmitted signal to form a first beat signal;

detecting peaks in the first beat signal; and performing a peak removal processing step, wherein the peak removal processing step comprises:

grouping together peaks detected within a predetermined frequency difference; and eliminating the grouped together peaks from further processing.

2. The method of claim 1 further comprising the step of:

counting the number of peaks detected to generate a peak count; and comparing the peak count to a predetermined threshold; wherein the performing a peak removal processing step occurs only if the peak count exceeds the predetermined threshold.

3. The method of claim 2, further comprising the steps of transmitting a frequency-modulated signal to form a second beam adjacent the first beam;

beating a received signal from the second beam with the transmitted signal forming the second beam to form a second beat signal;

detecting peaks in the second beat signal;

identifying any independent peaks in the second beat signal corresponding to peaks within the grouped together peaks; and excluding any identified peaks from the grouped together peaks.

4. The method of claim 3, wherein the radar device is a continuous-wave radar device.

5. The method of claim 4, wherein the radar device transmits and receives radio waves.

6. The method of claim 4, wherein the radar device transmits and receives ultrasound waves.

7. The method of claim 4, wherein the radar device transmits and receives light waves.

8. A radar device, comprising:

a transmitter for transmitting a frequency-modulated wave;

a receiver for receiving signals from objects reflecting the transmitted frequency-modulated wave;

a mixer for beating together the transmitted and received signals to form a beat signal;

a detector for detecting peaks within the beat signal; and a roadside object processor, the roadside object processor configured to group together peaks detected within a predetermined frequency difference and eliminate the grouped together peaks from further processing.

9. The radar device of claim 8, wherein the transmitter and receiver operate in the radio frequency range.

10. The radar device of claim 8, wherein the transmitter and receiver operate in the ultrasound frequency range.

11. The radar device of claim 8, wherein the transmitter and receiver operate in the optical frequency range.

* * * * *